INVENTORS
CURTIS LANE
KENNETH GLEMBY
BY LEON GREENSTEIN

Steinberg & Blake
ATTORNEYS

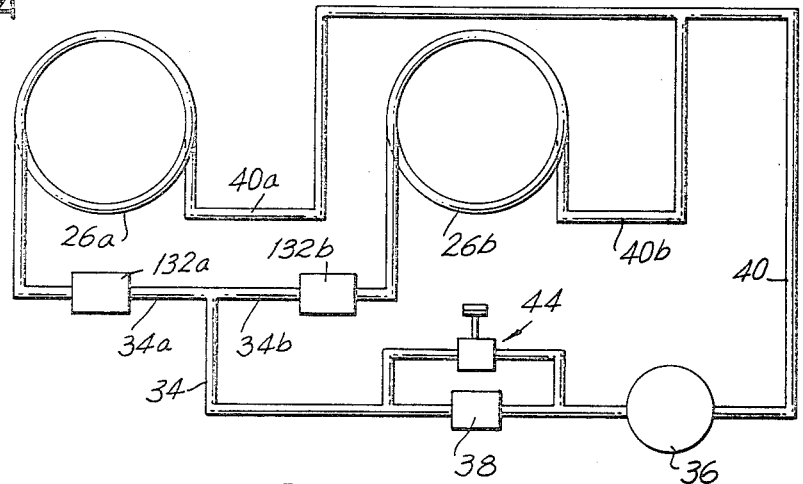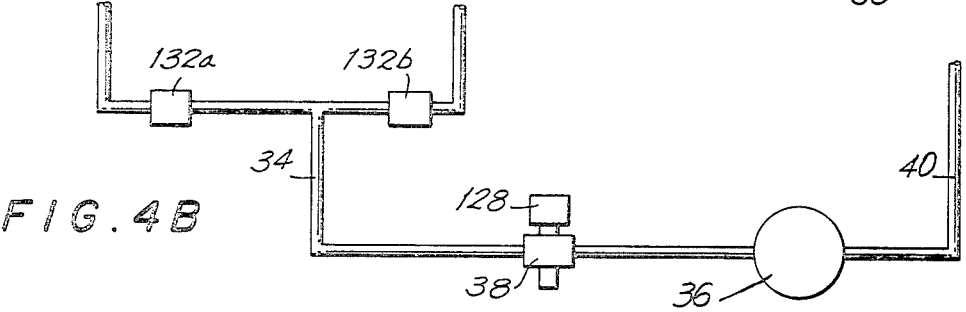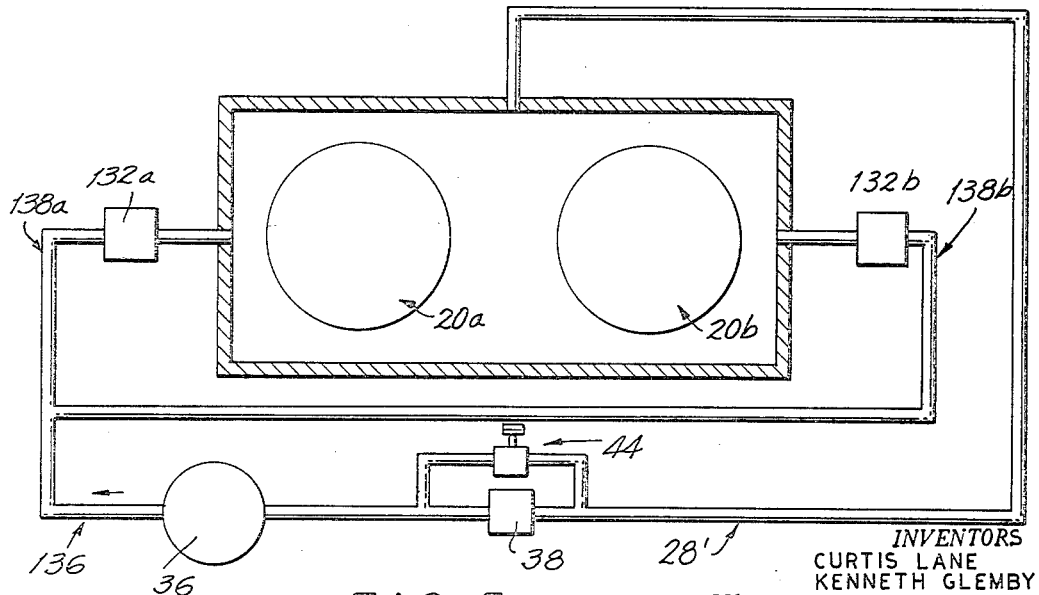

United States Patent Office 3,479,835
Patented Nov. 25, 1969

3,479,835
MACHINE FOR DISPENSING A SEMI-SOLID,
CHILLED, EDIBLE PRODUCT
Curtis Lane, Riverdale, N.Y., and Kenneth Glemby,
Woodcliff Lake, and Leon Greenstein, Cranford, N.J.,
assignors to Lanex Importing Company, Lodi, N.J.
Filed Jan. 17, 1968, Ser. No. 698,496
Int. Cl. F25c 7/16
U.S. Cl. 62—135                                    3 Claims

ABSTRACT OF THE DISCLOSURE

A vending or non-vending machine for dispensing a carbonated or non-carbonated edible product in a chilled semisolid condition and a method for operating the machine. A supply of the product in liquid condition is maintained in a closed container from which the liquid is delivered to an agitating means which is refrigerated and which converts the product from its liquid into its chilled, semisolid condition, and a dispensing means coacts with the agitating means for dispensing the product therefrom. The liquid which is in the closed container is maintained at a pressure higher than atmospheric pressure so as to reduce the tendency of the product to freeze, and in addition carbon dioxide is incorporated into the liquid so that the liquid is in a carbonated condition further depressing the freezing point. Also, the agitating means is intermittently actuated to further reduce the tendency of the product to freeze. During actual dispensing of the product the agitating means is refrigerated to an increasing degree so as to increase the rate at which the product is converted from liquid into chilled, semisolid condition.

Background of the invention

The present invention relates to a machine for dispensing an edible product in chilled, semisolid condition and to a method for operating the machine.

Machines of this latter general type are used to dispense an edible product which may be in the nature of a sherbet, a soft ice cream or any mushy, semisolid, flavored carbonated or non-carbonated edible product in a chilled condition.

While machines of this general type are known, serious difficulties have been encountered in preventing the product from freezing. It has been practically impossible to control the machines in such a way that solid ice crystals formed will be prevented from building a solid frozen substance. Because the product is required to flow through passages, valves, nozzles, and the like, during dispensing of the product, the actual reduction in the temperature of the product to the condition where solid packing of ice crystals takes place prevents proper functioning of the machine, and up to the present time it has not been possible to avoid this drawback under all operating conditions.

An additional drawback which is encountered in practice is the incapability of a machine of a given size to deliver the product in the required chilled, semisolid condition during periods when the product is dispensed at a relatively high rate. Thus, it is uneconomical to provide relatively large machines which are designed only for peak loads. On the other hand, when machines are designed for an average dispensing rate, it cannot be avoided that at rates higher than the average dispensing rate the machine is incapable of converting the liquid into a product in chilled semisolid condition at a dispensing rate which is higher than the average dispensing rate for which the machine is designed.

Summary of the invention

It is accordingly a primary object of the present invention to provide a machine and method for operating the same which will avoid the above drawbacks.

In particular, it is an object of the invention to provide a machine and method of the above type which will reliably prevent excessive freezing of the product, so that the temperatures can be controlled and packing of ice crystals will be prevented.

Also, it is an object of the invention to provide a machine and method of the above type which will be capable of compensating for a dispensing rate which is higher than the average dispensing rate so as to maintain formation of the same quality and standard of the desired product in chilled, semisolid condition at a rate which is equal to dispensing rates substantially in excess of those for which a given machine is initially designed. In other words, it is an object of the invention to provide a machine which while being of a size which would normally be required for dispensing product at a given rate nevertheless is capable of efficiently dispensing the product at a highly increased rate without any increase in the size of the machine.

It is furthermore an object of the invention to provide a machine and method of the above type which give to the consumer a selection from among different flavors while at the same time limiting the features in connection with the increased dispensing rate only to that product which has the selected flavor.

Furthermore, it is an object of the invention to provide a structure and method which can be readily adapted to existing machines so that the latter can be provided with the advantages of the present invention.

The machine of the invention has a closed container for the product in liquid condition, and an agitating means communicates with the closed container to receive the liquid therefrom and to agitate the liquid so as to convert it into a semisolid condition. A refrigerating means coacts with the agitating means to refrigerate the latter so that the product is in a chilled, semisolid condition in the agitating means. A dispensing means coacts with the agitating means to dispense the product therefrom. The container for the liquid is maintained, in accordance with one feature of the invention, at a pressure greater than atmospheric pressure, so that because of this increased pressure at which the liquid is maintained the tendency of the product to freeze is reduced. In addition, carbon dioxide is incorporated into the liquid so that the latter is in a carbonated condition, which is one of the conditions desired in the finished product, and which further contributed to the prevention of freezing of the product. A drive means is provided for driving the agitating means, and a control means is provided for intermittently actuating the drive means, so that in accordance with an additional feature of the invention the agitating means is intermittently actuated to contribute also in this way to prevention of freeze-up of the product. The refrigerating means which refrigerates the agitating means includes a refrigerant conduit which leads to a compressor of the refrigerating means, and in this latter refrigerant conduit is a back pressure regulator which in itself is known. However, in accordance with a further feature of the invention a bypass conduit communicates with the refrigerant conduit and bypasses the back pressure regulator, and this bypass conduit carries a solenoid valve which is automatically actuated when the product temperature rises to a given value so that in this way when product is withdrawn from the agitating means the degree to which the latter is refrigerated by the refrigerating means will be increased, so as to increase the rate at which it is possible to form the chilled, semisolid product from the liquid product. It is also possible to directly control the back pressure regulator automatically to serve the same purpose.

Brief description of drawings

The invention is illustrated by way of example in the accompanying drawings which form part of this application and in which:

FIG. 4A is a schematic refrigerant circuit;

FIG. 4B shows schematically another embodiment to replace the bypass for the back pressure regulator; and FIG. 5 is a schematic representation of another embodiment of a refrigerant circuit.

Description of preferred embodiments

Figure 1:
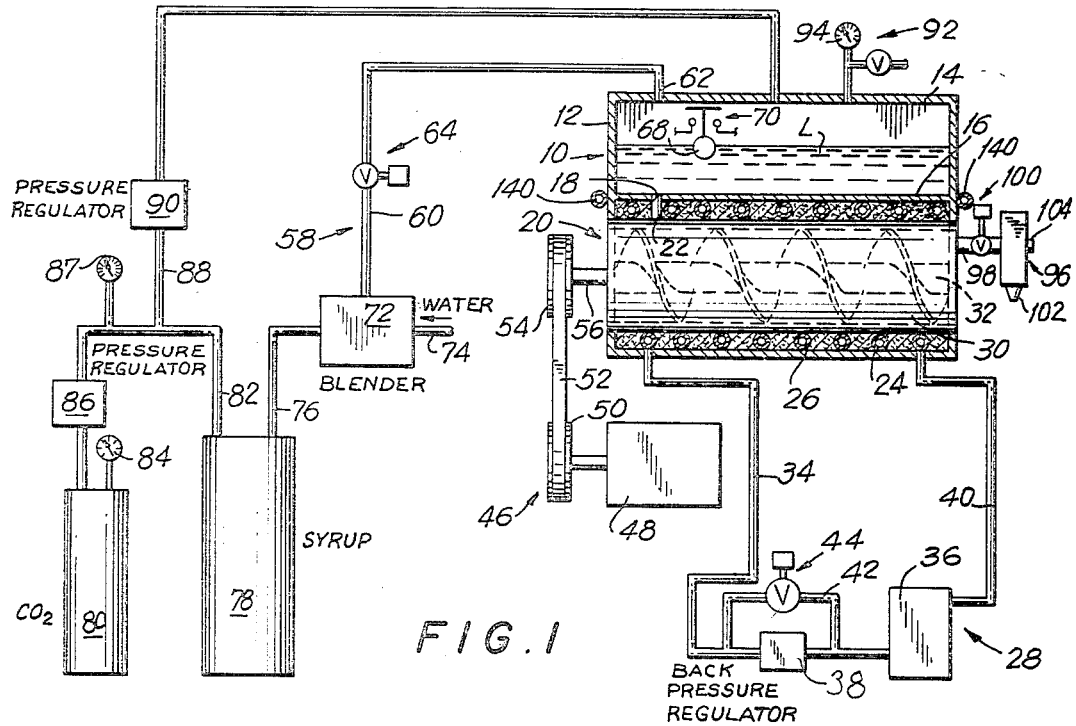
FIG. 1 is a schematic side elevation, partly in section, illustrating one possible embodiment of a machine and method of the invention.

Referring now to FIG. 1, there is schematically illustrated therein an upper container 10 which contains a liquid L which is the product in liquid condition. The container 10 has an endless side wall 12 which may be of rectangular configuration in plan, for example, and it has a top wall 14 which is fluid-tightly fixed to the side wall 12, as by being bolted directly thereto, so that in this way the container 10 is tightly closed at its top end. The container 10 has a bottom wall 16 fixed at its outer periphery to the side wall 12 and formed with an opening 18 through which the liquid product L can flow to an agitating means 20 which is in permanent communication with the interior of the container 10 through the opening 18 in the bottom wall thereof as well as through a tube 22 which is in register with the opening 18 and which passes through insulation at an upper portion of a cylindrical housing 24 which forms the housing of the agitating means 20. The housing has an inner cylindrical wall 30 surrounded by insulated coils 26 of a refrigerating means 28. Thus, these coils 26 are helically wound around the inner wall 30 of the agitating means 20, and this inner wall 30 communicates through the tubular component 22 with the opening 18.

The agitating means 20 includes a rotary auger 32 which agitates the liquid product which flows by gravity into the interior of the cylindrical barrel 24 of the agitating means 20, and as a result of the refrigeration derived from the refrigerating means 28 and the agitation derived from the rotary auger 32 the liquid product L is converted into a chilled, semisolid product. Because the auger has a screw carried by and surrounding a solid shaft, the product is maintained away from the axis of the barrel in the region of the refrigerated wall thereof.

The refrigerating means 28 includes a return conduit 34 communicating with the coils 26 for returning the refrigerant to a motor-compressor unit 36 which is schematically indicated. The refrigerating means is schematically represented to show only enough structure thereof to afford an understanding of the invention. It will be understood that many conventional components such as condenser coils, a back pressure switch, and the like are included in the refrigerating means but are not shown since they are very well known in the art and do not in and of themselves form part of the present invention.

The return conduit 34 feeds into the suction side of the compressor unit 36 and carries a back pressure regulator 38 which in a known manner controls the temperature of the refrigerant automatically. The refrigerant is fed under pressure from the unit 36 through a conduit 40 back to the coils 26 at the end thereof opposite from the end which communicates with the return conduit 34.

In accordance with one of the features of the invention which is described in greater detail below, the refrigerating means 28 includes a bypass conduit 42 which bypasses the back pressure regulator 38 and which carries a solenoid valve 44 which when actuated will open the bypass conduit 42 so as to provide a sharp reduction in pressure and thus increased refrigeration, the manner in which the components 42 and 44 of the refrigerating means operate and are actuated being described in further detail below.

A drive means 46 is provided for driving the agitating means 20, and this drive means includes, for example, an electric motor 48 which is controlled in a manner described below and which drives a pulley 50 which in turn drives a belt 52. The belt 52 drives a pulley 54 fixed to the shaft 56 which extends fluid-tightly through an end wall of the barrel 24 into the interior thereof where the shaft 56 fixedly carries the auger 32, so that when the drive means 46 operates the auger 32 rotates in order to agitate the product. The shaft 56 is supported for rotary movement together with the auger 32 by any suitable bearings.

A supply means 58 is provided for supplying the liquid L to the container 10, and this supply means 58 includes a supply conduit 60 which has an open end 62 fluid-tightly connected to the top wall 14 and communicating through an opening thereof with the interior of the container 10. This conduit 60 carries a solenoid valve 63, and within the container 10 is a float assembly 68 which closes a switch 70 when the level of the liquid L falls to a predetermined elevation, this switch 70 being electrically connected to the solenoid valve 64 for automatically opening the latter as long as the switch 70 is closed. When the liquid level rises the switch 70 will open so that the solenoid valve 64 will close, and in this way a given quantity of liquid L is maintained in the container 10.

The conduit 60 receives the liquid product from a blender 72 connected to a water supply conduit 74 and to a syrup supply conduit 76, the syrup and water being blended in a well known manner in the blender 72 so as to provide the liquid L with a preselected Brix degree.

The syrup which flows through the conduit 76 into the blender 72 is derived from a syrup supply container 78 which contains syrup of any flavor and of a Brix degree much higher than that of the liquid product L.

A tank of carbon dioxide gas 80 which is under relatively high pressure communicates through a conduit 82 with the syrup supply container 78, so that the liquid product L has carbon dioxide incorporated into itself and is thus in a carbonated condition in the container 10. The pressure of the carbon dioxide in the tank 80 may be read at a pressure gauge 84, and the conduit 82 carries a well known pressure regulator 86 such as a diaphragm type of pressure regulator for reducing the pressure of the gas so that as it flows through the conduit 82 downstream of the regulator 86 into the syrup supply tank 78 the carbon dioxide will have a pressure which may be read at the gauge 87, this pressure being substantially less than the pressure of the gas in the tank 80.

The conduit 82 communicates with a further conduit 88 which carries a second pressure regulator 90 which may be of the same type as the pressure regulator 86, and this conduit 88 communicates also through the top wall of the container 10 with the interior thereof in a fluid-tight manner. The pressure regulator 90 provides a further reduction in the pressure so that the carbon dioxide gas which is in the container 10 over the liquid L therein will have a preselected pressure determined by the regulator 90.

An adjustable safety valve 92 also communicates fluid-tightly through the top wall 14 with the interior of the container 10, and this valve is set at a pressure slightly higher than that provided by way of the regulator 90 and will prevent excess build-up of pressure beyond the selected value in a well known manner. The safety pressure valve 92 has a gauge 94 which enables the operator to read the pressure of the gas within the container 10 over the liquid L therein.

A dispensing means 96 is provided for dispensing the product in its chilled, semisolid condition from the agitating means 20, and this dispensing means 96 includes a short outlet pipe 98 carrying a solenoid valve unit 100 and communicating with a discharge nozzle 102 from which the product discharges into a suitable container such as a cup or the like. A manually operable button or coin-operated mechanism 104 is available to the operator for actuating the dispensing means 96, so as to energize and open the solenoid valve 100, and the product will then be withdrawn from the agitating means in a manner which is described in greater detail below.

The carbon dioxide in the tank 80 is initially at a pressure of 1500 lbs., for example, and this pressure continuously drops while the carbon dioxide flows from the tank 80. The pressure regulator 86 is set to reduce the pressure of the gas to a range of 20–100 lbs., and this pressure is preferably in the region of 50 lbs. which may be read at the gauge 87. Thus carbon dioxide gas at a pressure of approximately 50 lbs. is fed into the syrup container 78.

As a result of the rise in the pressure of the syrup in the container 78, it flows in carbonated condition under pressure through the conduit 76 into the blender 72 where it is blended with the water supplied through the water supply conduit 74.

The syrup in the container 78 may be a syrup of any desired flavor and has a concentration on the order of 30–60° Brix. After being blended with the water in the blender 72, the liquid L has 11–15° Brix, and is preferably approximately 13° Brix. The same pressure which is derived from the tank 80 to displace the syrup from the tank 78 into the blender 72 is used to displace the liquid from the blender 72 along the conduit 60 into the container 10, and as the liquid product flows along the conduit 60 it is at a pressure on the order of 3–25 lbs., preferably at a pressure of approximately 5 lbs. This reduction in pressure from the 50 lbs. at which the carbon dioxide is delivered to the syrup container 78 takes place as a result of the flow of the fluid from the container 78 into the blender and as a result of the addition of the water to the syrup in the blender and the flow of the resulting liquid along the conduit 60 into the container 10 which is set to operate under pressure of approximately 5 lbs.

In order to enhance the uniformity of the pressure of the liquid L in the container 10, the additional branch 88 is provided with the pressure regulator 90 therein to provide through this branch a pressure or 3–5 lbs., preferably approximately 5 lbs.

The extent to which carbon dioxide is incorporated into the liquid is on the order of 2–5 volume, which is to say the carbon dioxide gas incorporated into the liquid will be approximately 2–5 times the amount of air which is entrained in the liquid and in the product which is delivered from the agitating means upon actuation of the dispensing means. Thus, the liquid delivered to the container 10 is approximately 13° Brix and has 2–5 volume carbon dioxide while being at a pressure of approximately 5 lbs. It has been found that when the structure of FIG. 1 is operated under these conditions a highly satisfactory product is delivered from the nozzle 102 upon actuation of the switch-operating button 104 which actuates the solenoid valve 100 to open the discharge 98 from the agitating means 20 to the nozzle 102.

Figure 2:
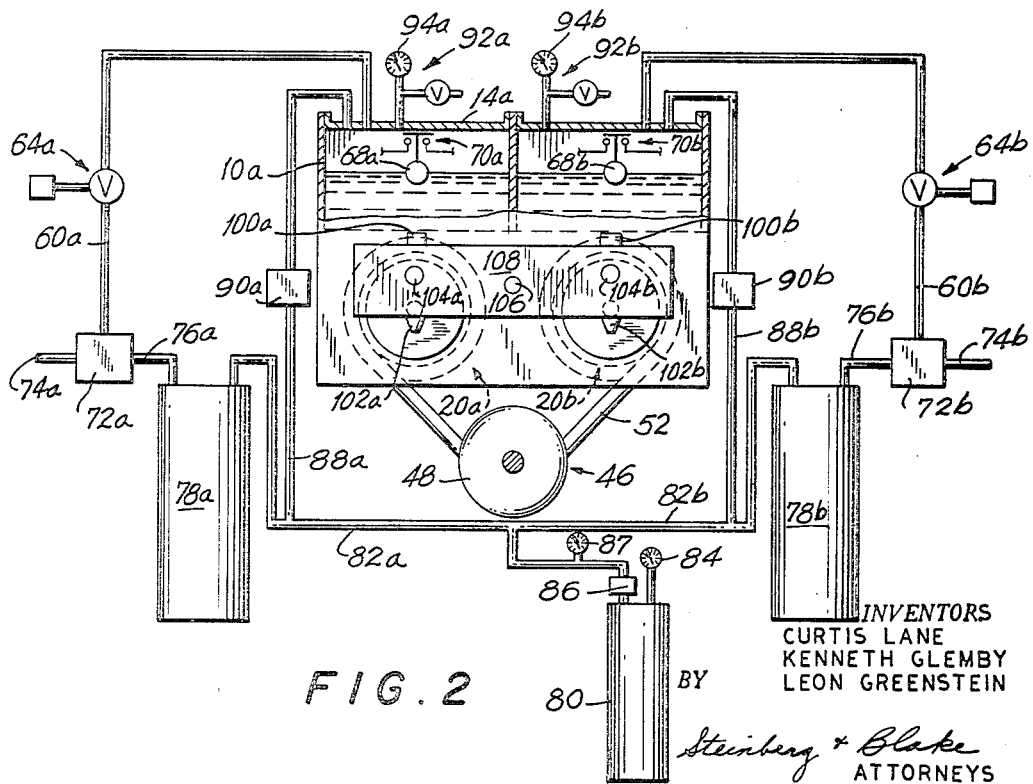
FIG. 2 is a schematic front view of the machine and method of FIG. 1 showing in particular how it is used in connection with a machine which is capable of selectively dispensing products of different flavors.

Although the method and machine of the invention can be provided in connection with a single unit as referred to above and described in connection with FIG. 1, it is preferred to provide a machine which includes all of the above features but which has a pair of units as shown in FIG. 2, in a schematic manner, or which has even more units, so as to provide the possibility of selection of one of the plurality of different flavors of the product. Those components of the separate units which are duplicated therein the indicated with the same reference characters as FIG. 1 followed by the letter *a* for the left unit of FIG. 2 and with the same reference characters followed by the letter *b* for the right unit of FIG. 2. However, it will be noted from FIG. 2 that the pressurized tank 80 of carbon dioxide is common to both of the units and also that the pulley 50 of the drive means 46 is common to both of the units, with the motor 48 also being common to both of the units. The belt 52 passes from the pulley 50 not only around the pulley 54 which is fixed to the shaft 56 of the auger 32 of one of the units of FIG. 2, but in addition this same belt passes around a second pulley corresponding to the pulley 54 and fixed to the shaft which carries the auger of the second unit. Thus, the pair of agitating means 20*a* and 20*b* will have a common drive means 46.

The dispensing means of FIG. 2 has a pair of dispensing nozzles 102*a* and 102*b* and a pair of actuating vending or selecting buttons 104*a* and 104*b* which will actuate the solenoid valves 100*a* and 100*b*, respectively, so that in this way the operator can select to withdraw either from the agitating means 20*a* or from the agitating means 20*b*. However, in this case the dispensing means 96 has a common support 108 which carries a presetting unit 106. This unit may be a coin operated presetting switch which will only preset the dispensing means to extract product from either of the agitating means when a coin has been introduced into the unit 106, or the latter may simply be a manual presetting structure which must be initially actuated before dispensing will take place in response to actuation of a selected button 104*a* or 104*b*. In the case of FIG. 2 each of the units operates precisely in the manner described above in connection with FIG. 1.

Figure 3:
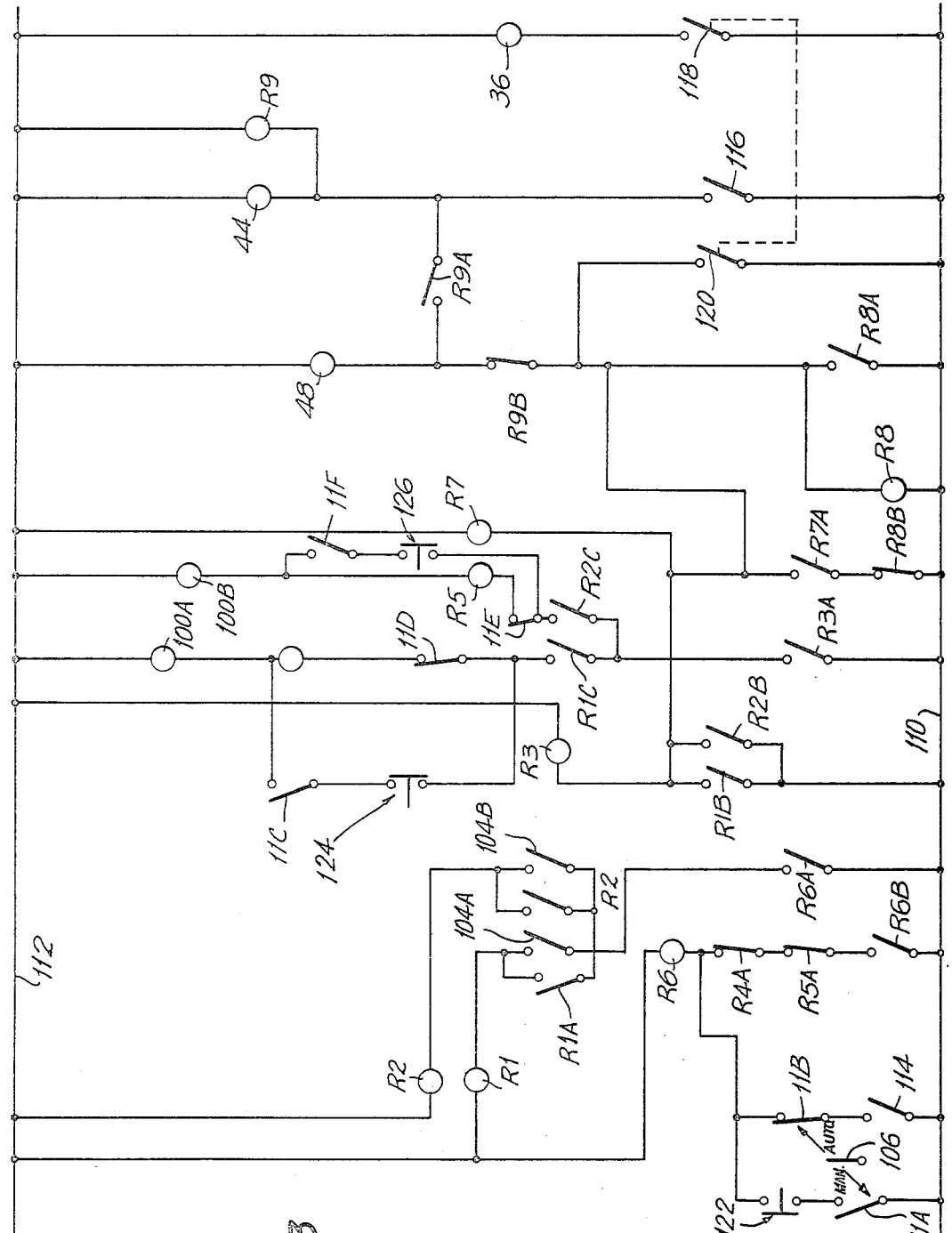
FIG. 3 is a wiring diagram showing the electrical controls.

Referring now to the wiring diagram of FIG. 3, it will be seen that the electrical power for operating the machine is derived from a pair of lines 110 and 112. As is shown at the lower left of the wiring diagram of FIG. 3, the presetting switch 106 may be turned in one direction to provide for automatic coin-actuated operation and in another direction to provide for manual operation. The circuit is shown positioned for automatic coin-actuated operation, and in this position a gang of switches 11A–11F are in the positions illustrated in FIG. 3, whereas when the selector 106 is set for manual operation the gang of switches 11A–11F are displaced so that those which are normally open become closed and those which are normally closed become open, as will be described in greater detail below. It will be noted, however, that when set for automatic coin-actuated operation the normally closed switch 11B is in the circuit which includes the coin-actuated switch 114, so that upon insertion of a coin this latter switch becomes closed and thus a shut-down relay R6 becomes energized so as to close the normally open switches R6A and R6B. The switch R6B maintains the relay R6 energized even after the switch 114 opens. The relay switch R6A is located in a circuit which includes the flavor selecting buttons 104A and 104B, so that depending upon the flavor which is selected one or the other of these switches 104A or 104B will be closed. If the operator should select to close the switch 104A the dispense relay R1 will become energized closing the switch R1A so as to maintain the relay R1 energized after the switch 104A opens. On the other hand, if it is the switch 104B which is closed, then the dispense relay R2 will be energized closing the switch R2A which will maintain the latter relay energized, and of course the energizing of either one of the dispense relays R1 and R2 depends upon the continued energizing of the shut-down relay R6 which maintains the switch R6A closed.

If the switch 104A has been closed to energize the relay R1, then the normally open relay switch R1B will also be closed, while if the switch 104B has been closed, then the energized relay R2 will also close the normally open relay switch R2B. As is apparent from FIG. 3, irrespective of which of the relay switches R1B and R2B is closed, a timer relay R3 will be energized and this timer relay is a delay type of timer which will only close the normally open switch R3A after a delay which may be on the order of ten seconds. The closing of the relay switch R1B or R2B will energize an agitator drive relay R7 which automatically closes its relay switch R7A so as to maintain the relay R7 energized through the normally closed switch R8B which is referred to below. It will be noted that in this way the circuit through the normally closed switch R9B, also referred to below, and the agitator driving motor 48 will be energized, so that during the delay determined by the timer relay R3, before the switch R3A is closed, the agitators are driven and the product is in motion before it is actually dispensed. This delay gives the machine an opportunity to have the agitators come up to their operating speed and to have the product in a good agitated condition before it is actually dispensed.

It will be noted that the relay switch R3A is in series with a pair of parallel-connected circuits which respectively include the dispensing solenoids 100A and 100B which actuate the dispensing solenoid valves. The circuit which includes the dispensing solenoid 100A includes a dispense timer relay R4 which will determine the time during which actual dispensing takes place, this time being on the order of 1½ or two seconds, so that in this way a predetermined amount of the product will be dispensed. This circuit also includes the normally closed switch 11D and the relay switch R1C which is normally open and which is closed upon energizing of the relay R1.

In the same way the circuit which includes the dispensing solenoid 100B has a dispensing timer relay R5 which will provide the same period of dispensing as the relay R4 and through the normally closed switch 11E this solenoid 100B and timer relay R5 are connected to the relay switch R2C which is normally open and becomes closed only if the relay R2 is energized should the operator close the switch 104B. Thus, by way of the switches R1C and R2C it is only possible to energize that dispensing solenoid 100A or 100B which will provide the selected flavor, and neither one of these solenoids can be energized until the switch R3A closes upon elapse of the delay period for which the relay R3 has been set. Therefore, before actual dispensing for the period of time determined by the relays R4 or R5 the product is agitated by the operation of the agitator driving motor 48 through the energizing of the relay R7, and upon closing of the switch R3A a predetermined amount of product will be dispensed as a result of the actuation derived from the dispensing timers R4 or R5.

After these timers R4 or R5 have been energized for a given time on the order of 1½ or two seconds, so that a predetermined amount of product has been dispensed, the normaly closed dispense timer relay switch R4A will be opened in the event that the switch 104A was closed, or the normally open dispense timer relay switch R5A will be opened by the timer relay R5 in the event that the switch 104B was closed, and this will of course result in deenergizing of the relay R6, so that the switch R6B opens also and now the apparatus is shut down and ready for the next cycle of operations.

One of the features of the invention resides in intermittently driving the agitators irrespective of whether or not any product is dispensed. In this way the product is maintained in motion at given intervals so as to reduce further any tendency of the product to freeze, this tendency also being reduced, as pointed out above, by the combination of the product and by the elevated pressure within the container 10. For the purpose of intermittently driving the agitators a clock-actuated relay R8 is provided to become energized every fifteen minutes, for example, for a period of 15 or 20 seconds, so that in this way the product will be intermittently maintained in motion. When the unillustrated clock mechanism thus energizes the relay R8, the normally closed switch R8B which is series with the switch R7A will become open, so that the relay R7 can become energized only if the relay R8 is not energized. This latter relay will close the normally open switch R8A so as to energize the driving motor 48 through the switch R9B which is in series with the switch R8A as indicated in FIG. 3. In this way through the clock-actuated timer relay R8 the agitator means will be intermittently operated even if no product is withdrawn.

As is also indicated in FIG. 3, the solenoid valve 44 of the bypass 42 is in series with a temperature-responsive means which includes the temperature-actuated switch 116 actuated by a thermostat, for example, which senses the temperature of the product in the pair of agitating means 20A and 20B. Thus, the product in the barrels 24 of each of these means has its temperature sensed through a thermostat structure, and when the temperature of the product rises to a given value the switch 116 will be automatically closed so as to energize the solenoid valve 44 and thus open the bypass 42, bypassing the back pressure regulator 38 and providing a sudden substantial rise in the pressure of the fluid in the return conduit 34 flowing to the suction inlet of the compressor 36, so that in this way a known back pressure switch 118 which is connected to the compressor 36 will when the pressure rises to a given value energize the compressor 36 to provide an increased degree of refrigeration beyond what would normally occur if the solenoid valve 44 were not energized. The closing of the switch 116 will energize simultaneously with the solenoid valve 44 a relay R9 which closes the normally open relay switch R9A and which opens the normally closed relay switch R9B. The opening of the latter switch will prevent the agitator means from being driven by the motor 48 through the timer R8, and at this time the agitator means are driven simultaneously with the energizing of the bypass solenoid valve 44.

It is to be noted that ordinarily, as when no product is dispensed, the back pressure regulator 38 and the back pressure switch 118 are easily capable of maintaining the product at the required temperature. This temperature will be too low to bring about closing of the switch 116. However, if it should happen that the product is dispensed at a rate which is so great that it is not possible for the structure to maintain the product at the desired temperature, then the switch 116 will be closed to bring about by-passing of the back pressure regulator 38 so that under these conditions an increased degree of refrigeration can be achieved so as to reliably maintain the product in the desired condition even during rates of dispensing which are beyond the average rate for which the machine may be designed. Therefore, as a result of this feature it becomes possible to provide for a machine which is designed for a given rate of dispensing; a rate of dispensing in excess of that for which the machine is designed while at the same time maintaining the product at the required low temperature.

Whenever the compressor 36 of the refrigerating means operates the agitator means also operates so that refrigeration never takes place without agitation, and for this purpose a switch 120 is coupled with the switch 118, as shown in phantom lines in FIG. 3, bringing about closing of the switch 120 whenever the back pressure switch 118 is closed. The closing of the switch 120 will provide through the normally closed switch R9B actuation of the agitator driving motor 48, so that whenever the compressor 36 operates agitation also takes place.

If the presetting switch 106 is set for manual operation, then the gang of switches 11A–11F are actuated so that the normally open switches 11A, 11C and 11F become closed, while the normally closed switches 11B, 11D and 11E become open. The opening of the switch 11B will prevent actuation of the shut-down relay R6 through the coin-actuated switch 114. The closing of the switch 11A will enable the cycle to be started by manual closing of a manually operable switch 122. Thus, the closing of the switch 122 will now energize the relay R6 and the operator will select one of the switches 104A or 104B depending upon the desired flavor, as pointed out above. The relays R1 or R2 will be energized depending upon which of the latter switches are selected, and the result will be, as described above, closing of the switch R1B or R2B so as to energize the time delay relay R3 which will close the switch R3A after a given delay on the order of ten seconds, for example, during which the agitator means operates as a result of the actuation of relay R7, as pointed out above. The closing of the switch R1C if the switch 104A has been closed will enable the dispensing solenoid 100A to be energized through the switch 11C which is now closed upon manual actuation of a manual dispensing button 124, whereas if the switch R2C has been closed by selection of the switch 104B, then energizing of the dispensing valve solenoid 100B can take place through manual closing of the manual dispensing switch 126 through the now closed switch 11F. On the other hand, the opening of the switch 11D and the switch 11E prevents operation of the dispensing timers R4 and R5, so that the product will be dispensed as long as the operator maintains either the dispensing switch 124 closed or the dispensing switch 126 closed. When a desired amount of product has been dispensed, the operator will release the switch 124 or the switch 126, and now the starting switch 122 will be opened manually so as to shut down the operation. This switch 122 remains closed during the entire cycle of manual actuation and the opening thereof will deenergize the relay R6.

With a machine which has a pair of units as described above in connection with FIG. 2, there will be a single refrigerating means coacting with both of the units, and thus when the solenoid valve 44 is opened there will be a sudden rise in pressure giving additional refrigeration to both of the agitating means 20a and 20b. This system is illustrated schematically in FIG. 4A. While the method and machine described above will operate very efficiently to achieve the desired results, it may under some circumstances be desirable to prevent the additional refrigeration of that agitating means which is not selected for dispensation of product. For this purpose the return line 34 for the refrigerant has in its branches 34a and 34b a pair of solenoid valves 132a and 132b, and while these valves are normally in an open position, upon closing of a selected switch 104a or 104b, the solenoid valve 132a or 132b of the non-selected unit will be closed so that the additional refrigeration derived by way of the opening of the solenoid valve 44 will not act on the non-selected agitating means. These optional solenoid valves 132a and 132b are connected into the circuit in any suitable way.

As is shown in FIG. 4B, which otherwise may be the same as FIG. 4A, instead of a bypass conduit 42 controlled by a solenoid valve assembly 44, it is possible to connect directly to the back pressure regulator 38 a solenoid or gas-operated actuator 128 which will respond to the temperature-control switch 116 of the temperature responsive means so as to open the back pressure regulator directly, and in this way upon closing of the switch 116 if the temperature of the product rises to a given value the back pressure regulator 38 of FIG. 4B will become wide open also to increase the pressure of the refrigerant returning through the suction line to the compressor 36 so as to bring about an increased degree of refrigeration as described above.

Referring now to FIG. 5, instead of surrounding the pair of agitator means 20a and 20b with refrigerating coils, they may be located within a common refrigerating chamber 134 receiving refrigerant from the compressor 36 through the line 136, which corresponds to the line 40, and through the branches 138a and 138b. It is these branches which include the solenoid valves 132a and 132b for closing that branch 138a and 138b which leads to that agitator means which is not selected. Thus, if the operator actuates button 104a, so as to derive the product from the agitator means 20a, then the solenoid valve 132b will be closed thus limiting the additional refrigeration brought about by actuation of bypass solenoid valve 44 to the agitating means 20a. As is apparent from FIG. 5 the colder refrigerant will at this time enter only through the left of the chamber 134 to engage initially only the agitating means 20a and thus during the period required for the colder refrigerant to spread through the chamber 134 to the agitating means 20b only additional refrigeration will be received by the agitating means 20a, and before the additional refrigeration can have any appreciable influence on the agitating means 20b the operations in connection with the additional refrigeration will have been completed with respect to the agitating means 20a. In the same way if the operator selects to dispense material from the agitator means 20b, it is the solenoid valve 132a which will be closed and the additional refrigeration brought about by actuation of the solenoid valve 44 will be applied only to the agitating means 20b. The return flow of the refrigerant along the suction line 28' through the back pressure regulator 38 or through the bypass conduit takes place from the top of the chamber 134 in the manner indicated in FIG. 5.

It is to be noted that whether a chamber 134 is used as shown in FIG. 5 or coils 26a and 26b are used as described above, there will be a coil 140 communicating with the coils 26a and 26b or with the chamber 134 so that the refrigerant flows through this coil 140 which is shown schematically in FIG. 1 surrounding the bottom wall 16 of the container 10, so that in this way the bottom wall of the container 10 is itself cooled to provide liquid L which has previously been placed in a chilled condition by the time it reaches the pair of agitating means 20a and 20b.

It is apparent from the description of the machine and method of the invention that the prevention of freeze-up of the product is achieved through a number of expedients each of which contributes to this result and the combination of which provides in the most reliable manner absolute prevention of freeze-up under all operating conditions. Thus, the carbonation of the product will in and of itself contribute to the prevention of freeze-up of the product. However, according to one of the most important features of the invention the maintaining of the liquid L under pressure in the closed container 10 will also contribute to the prevention of freeze-up, and this maintenance of the pressure in the container 10 can of itself achieve the desired results in most cases. As is well known the increased pressure of the liquid will reduce the freezing temperature thereof. Furthermore, the agitation of the product by the agitating means 20a and 20b will also contribute to prevention of freeze-up. As is well known a product which is in movement is very difficult to freeze, and by way of the intermittent time control R8 the motor 48 will be intermittently energized to provide for intermittent agitation even when no product is withdrawn from the machine. Of course, during withdrawal of product from the machine the motor 48 also operates so that there will be additional agitation during actual withdrawal of the product. Therefore, the presence of carbonation, the pressure within the containers 10a and 10b, and the intermittent agitation which is provided as a minimum for the product all will contribute both separately and in combination to the prevention of freeze-up in a highly reliable manner.

As was indicated above, it may be that under some circumstances during withdrawal of product from the selected agitating means the agitating means will be incapable of forming the chilled, semisolid product at a rate which is fast enough, particularly when the rate of dispensing is higher than that for which the machine was initially designed. This latter undesirable result is avoided by way of the bypass conduit 42 and the solenoid valve 44 or by the control 128 of FIG. 4B. Of course, due to the resulting greater flow of the refrigerant the back pressure switch 118 will also be actuated much earlier than would otherwise be the case so that the compressor 36 operates to maintain the additional low temperature. As a result of this additional refrigeration which is automatically achieved during actual dispensing of product from the machine, the pair of agitating means 20a and 20b are capable of forming the chilled product in semisolid condition at an increased rate to compensate for a rate of dispensing which is greater than that for which the machine was initially designed.

Thus, with the machine of the invention it is possible to achieve a product in peak condition even when there is almost continuous dispensing of the product, and at the same time even if there should be extended idle periods during which no product is dispensed there will be no undesirable freezing of the product and the product will be maintained in a uniform condition.

What is claimed is:

1. In a machine for dispensing an edible product in a chilled, semisolid condition, a closed container for containing the product in liquid condition, agitating means communicating with said container for receiving the liquid therefrom and for agitating the liquid to convert it into a semisolid condition, refrigerating means coacting with said agitating means for refrigerating the latter to chill the liquid during conversion thereof into the semisolid condition, dispensing means communicating with said agitating means for dispensing the product in chilled, semisolid condition therefrom, and means communicating with the interior of said container for maintaining the liquid therein at a pressure greater than atmospheric pressure, a temperature-reducing means coacting with said refrigerating means for actuating the latter to increase the degree of refrigeration of said agitating means, and a temperature-sensing means sensing the temperature of the product in said agitating means and coacting with said temperature-reducing means for automatically setting the latter into operation whenever the temperature sensed by said temperature-sensing means rises to a given value, a pair of said closed containers, agitating means, dispensing means, and means for maintaining the liquid in the containers at greater than atmospheric pressure being provided for selectively dispensing products of different flavors by selection of one or the other of the dispensing means for operation, a single refrigerating means coacting with both of said agitating means for refrigerating the latter and including a single temperature-reducing means, and means actuated by the selection dispensing means for limiting the coaction of said temperature-reducing means only with that agitating means from which product is withdrawn by the selected dispensing means.

2. In a machine for dispensing an edible product in a chilled, semisolid condition, a closed container for containing the product in liquid condition, agitating means communicating with said container for receiving the liquid therefrom and for agitating the liquid to convert it into a semisolid condition, refrigerating means coacting with said agitating means for refrigerating the latter to chill the liquid during conversion thereof into the semisolid condition, dispensing means communicating with said agitating means for dispensing the product in chilled, semisolid condition therefrom, and means communicating with the interior of said container for maintaining the liquid therein at a pressure greater than atmospheric pressure, there being a pair of said containers and a pair of said agitating means respectively communicating therewith for receiving liquids of different flavors therefrom, respectively, said dispensing means communicating with both of said agitating means for selectively dispensing products from one or the other of said dispensing means, and a single refrigerating means coacting with both of said agitating means for refrigerating the products therein, respectively.

3. The combination of claim 2 and wherein said single refrigerating means includes a single temperature-reducing means, and a pair of temperature-sensing means sensing the temperature of the products in the pair of agitating means, respectively, and both coacting with said temperature-reducing means for automatically setting the latter into operation whenever the temperature sensed by one of said temperature-sensing means rises to a given value.

References Cited

UNITED STATES PATENTS

| Re. 25,859 | 9/1965 | Thomas | 62—233 X |
| 2,446,156 | 7/1948 | Kolz | 62—136 |
| 3,044,878 | 7/1962 | Knedlik | 62—306 X |
| 3,075,480 | 1/1963 | Berg | 62—136 X |
| 3,359,748 | 12/1967 | Booth | 62—342 X |
| 3,365,903 | 1/1968 | Lutz et al. | 62—306 X |
| 3,398,550 | 8/1968 | Lents | 62—306 X |
| 3,330,129 | 7/1967 | Halverson et al. | 62—342 |
| 3,403,523 | 10/1968 | Bauer et al. | 62—70 |

WILLIAM E. WAYNER, Primary Examiner

U.S. Cl. X.R.

62—233, 390, 69